United States Patent [19]

Brem et al.

[11] Patent Number: 4,975,613
[45] Date of Patent: Dec. 4, 1990

[54] ELECTRICAL MACHINE WITH HORIZONTAL AXIS AND RESILIENT SUPPORT OF STATOR CORE

[75] Inventors: Ernst Brem, Schlieren; Hansjürg Rohrer, Brugg, both of Switzerland

[73] Assignee: Asea Brown Boveri Ltd., Baden, Switzerland

[21] Appl. No.: 420,880

[22] Filed: Oct. 13, 1989

[30] Foreign Application Priority Data

Nov. 1, 1988 [CH] Switzerland ............... 4067/88

[51] Int. Cl.[5] .............................................. H02K 5/24
[52] U.S. Cl. ...................................... 310/258; 310/51; 310/91
[58] Field of Search ............... 310/51, 89, 91, 216, 310/254, 258

[56] References Cited

U.S. PATENT DOCUMENTS

| | | | |
|---|---|---|---|
| 2,561,994 | 7/1951 | Rachevsky et al. | 310/258 |
| 2,953,697 | 9/1960 | Wall . | |
| 3,462,624 | 8/1969 | Darrieus | 310/258 |
| 4,587,722 | 5/1986 | Miller | 310/258 |
| 4,663,553 | 5/1987 | Zimmermann | 310/216 |

FOREIGN PATENT DOCUMENTS

| | | |
|---|---|---|
| 0166114 | 1/1986 | European Pat. Off. . |
| 836683 | 4/1952 | Fed. Rep. of Germany . |
| 1117651 | 6/1968 | United Kingdom . |

OTHER PUBLICATIONS

Soviet Inventions Illustrated, week 8703, Jan. 21, 1987, Derwent (London, GB), & SU, A, 1234916 (Elektrosila), May 30, 1986.
Patent Abstracts of Japan, vol. 7, No. 33, (E-157) (1178), Feb. 9, 1983, & JP, A, 57-186937, Y. Giyuuchiyou, "Stator for Electric Rotary Machine".

Primary Examiner—Peter S. Wong
Assistant Examiner—D. L. Rebsch
Attorney, Agent, or Firm—Oblon, Spivak, McClelland, Maier & Neustadt

[57] ABSTRACT

In an electrical machine with horizontal axis, an elastic suspension of a laminated stator core, which deforms under the influence of the rotating magnetic field, is achieved by supporting the laminated stator core at a housing only in the area of the vertical plane of symmetry (V) and supporting the housing on a foundation only in the area of the horizontal plane of symmetry (H).

8 Claims, 3 Drawing Sheets

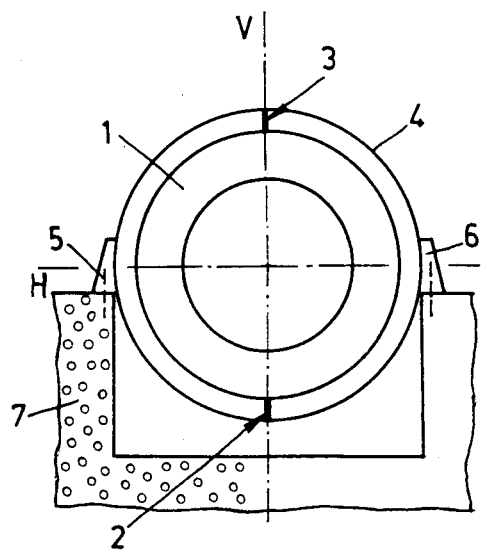
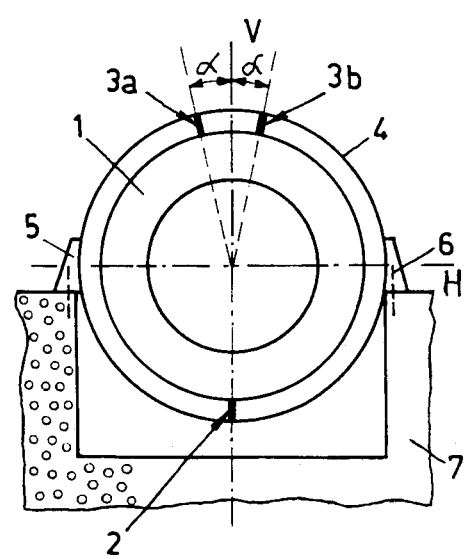
FIG.1  FIG.2
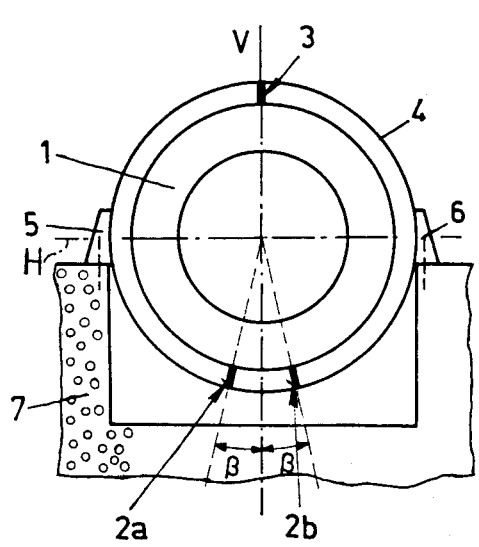
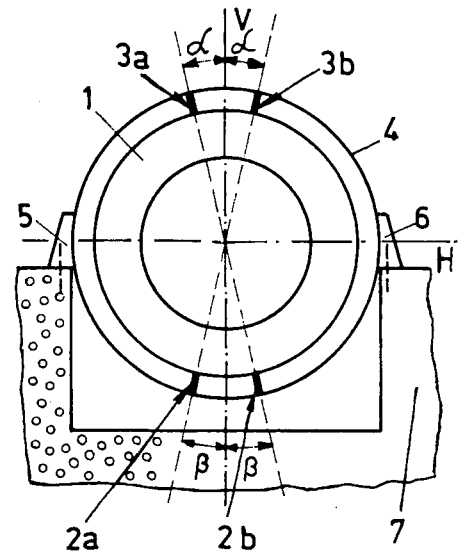
FIG.3  FIG.4

ELECTRICAL MACHINE WITH HORIZONTAL AXIS AND RESILIENT SUPPORT OF STATOR CORE

BACKGROUND OF THE INVENTION

1. Field of the Invention

The invention relates to an electrical machine with a horizontal axis, having a laminated stator core which is clamped in at least two vertical and mutually spaced annular support plates by means of mounting wedges distributed over its entire circumference, which support plates, in turn, are joined to the housing of the machine via mounting parts.

In this connection, the invention relates to a prior art which is found, for example, in European Patent Specification 0,166,114 or Swiss Patent Application 3557/88 of 23 Sept. 1988 of the applicant.

2. Discussion of Background

In gas-cooled electrical machines of the entire power range, large axial and radial strains occur in the laminated stator core which must be transferred to the housing, distributed as uniformly as possible.

In the air-cooled turbo generator known from European Patent Specification 0,166,114, this is carried out by laterally suspending the laminated stator core by means of support plates which are arranged in parallel, perpendicular to the axis of the electrical machine and are mutually spaced apart. To keep vibrations and thermal stresses occurring during the operating state of the electrical machine as small as possible, the support plates are constructed to be annular and are only connected in two areas of their horizontal plane of symmetry to the bottom part of the housing on both sides by means of mounting parts via extensions which extend vertically in a straight line. The by far greatest proportion of the circumference of the support plates is spaced away from the bottom and top part of the housing. The laminated stator core is clamped in the support plates by mounting wedges uniformly distributed over its entire circumference. The mounting parts consist of mounting plates which are in each case welded to the extensions of the support plates, and of tube sections with horizontal axis which are welded to the mounting plates. This type of mounting of the laminated stator core allows simple assembly, easy accessibility of the constructional parts to be welded together and ensures good quality of the welds.

However, the known arrangement mandatorily assumes a housing which is divided approximately in the horizontal plane of symmetry of the machine in order to be able to insert the laminated stator core. Thus, the transition to hydrogen cooling is not easily possible because, in particular, the interfaces between the bottom and top part of the housing are problematic with respect to sealing.

To be able to use an undivided housing in such machines, it is proposed in the Swiss patent application initially mentioned to have different diameters for the mounting plates attached to the annular support plates, which dimensions, seen from one machine end, are stepped towards the other end and, correspondingly, similarly to step the associated mounting points at the housing. In this arrangement, the transverse walls are constructed of two parts and consist of a first ring which is attached to the laminated stator core, and a second ring which is attached to the housing, in which arrangement the free ring ends overlap and a seal is provided at the overlap which is elastic at least in the axial direction. Seen from the other machine end, the outside diameters of the first rings are in each case smaller than the inside diameter of the second ring adjacent to it.

Such a machine allows a housing which is undivided (in the axial direction) because the laminated stator core (provided with the stator winding, if necessary) can be inserted into the housing. Closed housings of this type can be made gas tight in a much simpler manner and also withstand the higher gas pressures (approximately 10 bar) in the case of hydrogen cooling.

Both in the solution according to European Patent Specification 0,166,114 and in the solution according to the Patent Application initially mentioned, laminated-core vibrations, which are transferred via the housing and the housing support to the machine foundation, occur as a consequence of the rotating magnetic field of the rotor.

To eliminate these disturbing influences of the laminated-core vibrations, caused by the rotating magnetic field of the rotor, of alternating-current generators on the machine foundation, it is known that designs have been developed in which either the housing is elastically supported with respect to the foundation or the laminated core, which is held in an intermediate frame, is elastically connected with interposition of springs to the housing which is rigidly mounted on the foundation. Whilst the first-mentioned arrangement has the disadvantage that the vibrations occur at the housing and, under certain circumstances, cause more or less disturbing noises, the arrangement mentioned secondly, which also enables vibrations to be kept away from the housing, results in a relatively complex stator construction if the springs—which enable the radial excursion of the laminated core—are arranged tangentially with respect to the laminated core and are connected to the latter and to the outer housing frame.

It is also already known to mount within the stator housing spring members which are axially arranged at the ribs of the latter at which the laminated core is supported in such a manner that it can oscillate radially, utilizing the spring arrangement. In this arrangement, it is found that vibration loads are transferred to the machine housing over the entire length of the laminated core.

SUMMARY OF THE INVENTION

On the basis of what is known, accordingly, one object of this invention is to provide a novel electrical machine with horizontal axis which manages without elaborate spring or support elements and accordingly exhibits a simple and economic structure but, all the same, exhibits "spring elements" between laminated stator core and machine foundation.

In an electrical machine with horizontal axis of the generic type initially mentioned, this object was achieved, in accordance with the invention, by the fact that the mounting parts connecting the support plates and the housing are arranged only approximately in or symmetrically with respect to the vertical plane of symmetry of the machine at the lower and upper ends of the support plates and the machine housing is supported on the foundation via lateral housing support parts which are essentially only arranged in the area of the horizontal plane of symmetry of the machine housing.

Using this constructional solution, an elastic support of the laminated stator core with respect to the foundation is achieved without actual spring elements or spring elements specifically intended for this purpose, in that the housing walls or the housing wall sections between the mounting parts act as spring elements.

Apart from two mounting locations which are diametrically opposite to one another in the vertical plane of symmetry, arrangements are also possible in which the lower one is in the horizontal plane of symmetry and the upper one is divided into two locations which are arranged symmetrically with respect to the said plane of symmetry at up to 45° with respect to this inclined plane. An arrangement with two symmetrical mounting locations at the bottom and one central one at the top or with two symmetrical mounting locations at the top and the bottom is also possible. In each case, a sufficiently long wall section remains between the mounting locations and the housing support parts which ensures the spring effect according to the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows a simplified cross section through the stator of an electrical machine with one mounting location each;

FIG. 2 shows a first modification of the suspension according to FIG. 1 with one lower and two upper mounting locations;

FIG. 3 shows a second modification of the suspension according to FIG. 1 with one upper and two lower mounting locations;

FIG. 4 shows a third modification of the suspension according to FIG. 1 with two lower and two upper mounting locations each;

DESCRIPTION OF THE PREFERRED EMBODIMENTS

Figure 5:
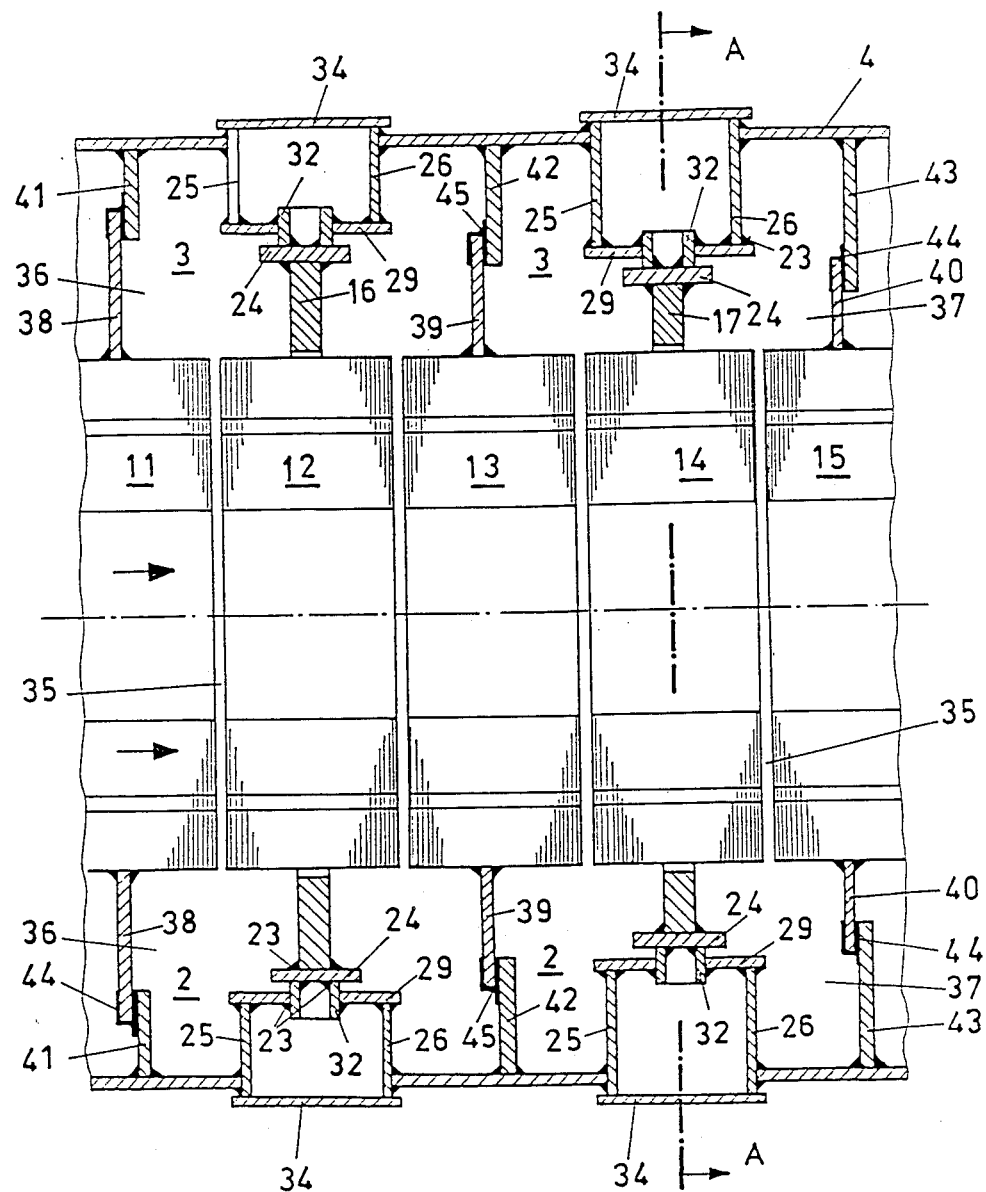
FIG. 5 shows a longitudinal section through the stator of an electrical machine in the vertical plane of symmetry with a more detailed representation of the lower and upper laminated-core suspension according to FIG. 1.

Referring now to the drawings, wherein like reference numerals designate identical or corresponding parts throughout the several views, in the greatly simplified cross section through the stator of an electrical machine according to FIG. 1, a laminated stator core 1 is arranged via a lower 2 and an upper mounting part 3 in a housing 4. These mounting parts 2, 3 are located in the vertical plane of symmetry V of the machine. The housing 4 is supported via lateral housing feet 5, 6, arranged in the region of the horizontal plane of symmetry H of the machine, on a foundation 7 and is there screwed to the foundation 7 in familiar manner. When the machine is operated, magnetic fields rotate at the frequency of the speed of rotation. These fields attempt to convert the laminated stator core 1 (into a rotating ellipse in the case of two-pole machines, into a rotating quadrangle in the case of four-pole machines, into a rotating hexagon in the case of six-pole machines, and so forth). These core deformations are one of the causes of magnetic noises and vibrations of the stator housing (compare German book Wiedemann/Kellenberger "Konstruktion elektrischer Maschinen" (design of electrical machines) Springer-Verlag Berlin-Heidelberg-New York 1967, p. 337, 338). These deformations are transferred to the housing 4 via the mounting parts 2, 3 and cause a corresponding periodic deformation of the housing case. Because the housing section between the mounting parts 2, 3 and the housing feet 5, 6 is comparatively very long, it acts as spring element between the mounting locations of the laminated stator core 1 and housing 4, on the one hand, and the housing feet 5 and 6, on the other hand, so that separate spring elements can be omitted and an elastic support of the laminated stator core 1 on the foundation 7 is realized, nevertheless.

Instead of diametrically opposite mounting locations (FIG. 1), the upper mounting in the variant according to FIG. 2 is distributed to two mounting parts 3a and 3b. These are located symmetrically with respect to axis V and inclined by the angle $\alpha$ with respect to the plane V. The magnitude of the angle $\alpha$ is between a minimum, which is determined only by the design of the mounting parts 3a, 3b in practice, and about 45°.

In the arrangement according to FIG. 3, a mounting part 3 is in the vertical plane of symmetry V at the top and the lower mounting location is distributed to two mounting parts 2a, 2b which are inclined by the angle $\beta$ with respect to the plane V.

FIG. 4, finally, shows a combination of the arrangements according to FIGS. 2 and 3 with two mounting part pairs 2a, 2b and 3a, 3b each symmetrically with respect to plane V.

A more detailed description of the invention, applying the concept described in conjunction with FIG. 1, will be given in the text which follows.

Figure 6:
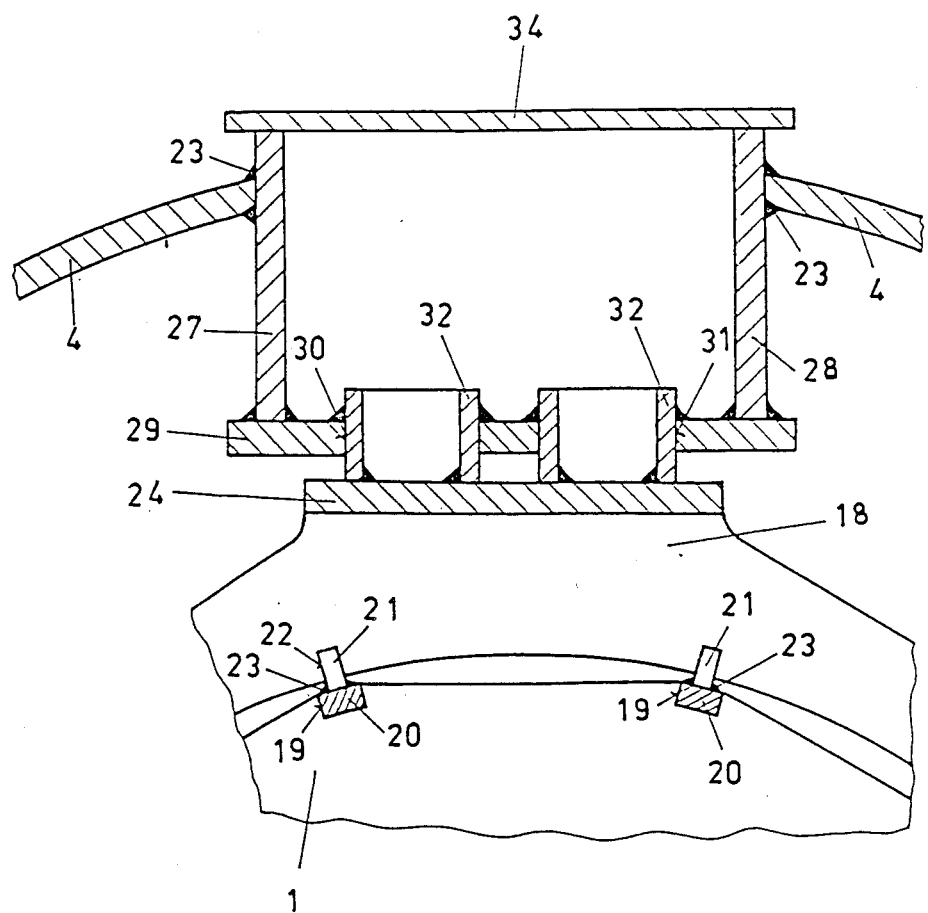
FIG. 6 shows a cross section through the stator according to FIG. 5 along the top line AA.

In FIGS. 5 and 6, the laminated stator core 1 consisting of axially spaced-apart laminated part-cores 11, 12, 13, 14, 15 is suspended in the housing 4 with the interposition of annular support plates 16, 17 and mounting parts provided in general with the reference numbers 2, 3. As can be seen in FIG. 6, the suspension is effected in the vertical plane of symmetry of the machine.

The support plates 16, 17 exhibit lateral (vertically pointing) extensions 18 (FIG. 6) in the area of the mounting parts 2, 3.

In the laminated stator core 1, slots 19 are provided which are uniformly distributed over its outside circumference and in which pressure bolts 20 with, for example, rectangular cross section, are located. These are used for axially clamping the laminated stator core 1.

The pressure bolts 20 are welded to the annular support plates 16 and 17 with interposition of wedges 21, the wedges 21 being located in axially extending slots 22 in the support plates 16 and 17; the welds in this arrangement are designated by 23.

The suspension of the annular support plates 16, 17 in the housing 4 is illustrated in all essential details in FIG. 5.

Vertically and axially extending mounting plates 24 are welded to the extensions 18. The housing 4 is provided in the area of these mounting plates 24 with box-shaped openings into which a box open on one side is welded. The vertical box walls are designated by 25, 26, 27, 28. The box bottom 29 extends approximately plane-parallel to the mounting plates 24. In the case of the example, each box bottom 29 exhibits two circular drilled holes 30, 31 through which tube sections 32, 33 with vertical axis are inserted.

These are both butt-welded to the mounting plates 24 and also welded to the box bottom 29. The boxes are each closed by a screwed-on cover 34.

Because the boxes are welded into the housing wall before the laminated stator core is assembled in the housing (still to be described), all these welds are easily accessible and can also be easily checked for tightness.

In the case of gas-cooled electrical machines, the space between the laminated stator core 1 and housing 4 is subdivided into several, typically at least three annular chambers which are used for supplying and removing the cooling gas respectively to the stator and to the stator winding and from the rotor through the distances 35 between the laminated part-cores 11, . . . , 15.

These annular chambers—only the two annular chambers 36 and 37 are visible in FIG. 5—are formed by radially extending two-part partitions. Each partition in this arrangement consists of a first ring 38, 39, 40 which is welded onto the laminated stator core 1, and of second rings 41, 42, 43 which are welded to the inside wall of the housing 4. The rings overlap radially and are sealed in the overlap area by means of an elastic sealing ring 44 with U profile which is folded over the first rings. In addition, the sealing ring exhibits an outward-pointing sealing lip 45.

To be able to insert the laminated stator core 1, which may already have been provided with the stator winding, into the housing 4 in the axial direction, the mounting plates 24 and the associated box bottoms 29 have increasingly smaller diameters seen from the insertion side. The same applies to the outside diameters of the first rings 38, 39, 40 and the inside diameters of the second rings 41, 42, 43. At the same time, it must also be ensured that the outside diameter at the level of the mounting plate 24 at the support plate 17 is smaller than the inside diameter of the ring 39 and smaller than the distance between the diametrically opposite box bottoms 29 which are associated with the support plate 16.

Only this ensures that the laminated stator core 1 can be inserted into the housing 4 (from left to right in the direction of the arrow in the case of the example).

After the insertion of the laminated stator core 1 into the housing, the two machine parts are aligned with respect to one another and temporarily clamped against one another. Appropriately cut tube sections 32, 33 are inserted into the drilled holes 30, 31 and initially butt-welded against the mounting plates 24, the welds 23 being located at the inside circumference of the tube sections. The tube sections are welded to the box bottom 29 (and thus to the housing) at the outside circumference of the tube sections 32, 33. This type of mounting, which is basically the subject-matter of European Patent Specification 0,166,114, provides absolutely no clearance problems. Any axial clearances existing in the first and second rings are taken up by the axial elasticity of the seals 44.

Naturally, the invention is not restricted to mounting parts 2, 3 according to European Patent Specification 0,166,114.

Dispensing with the possibility of inserting the stator core as a whole into the housing, the stepping of the mounting parts 2, 3 and of the rings 38, . . . , 43 can also be omitted.

Obviously, numerous modifications and variations of the present invention are possible in light of the above teachings. It is therefore to be understood that within the scope of the appended claims, the invention may be practiced otherwise than as specifically described herein.

WHAT IS CLAIMED AS NEW AND DESIRED TO BE SECURED BY LETTERS PATENT OF THE UNITED STATES IS:

1. Electrical machine with a horizontal axis, comprising a laminated stator core which is clamped in at least two vertical and mutually spaced-apart annular support plates by means of mounting wedges distributed over its entire circumference, wherein said support plates are joined to a housing of the machine via mounting parts, wherein the mounting parts joining the support plates and the housing are arranged only approximately in, or symmetrically with respect to, a vertical plane of symmetry of the machine at the lower and upper ends of the support plates and the machine housing is supported on a foundation via lateral housing support parts which are only arranged in an area of a horizontal plane of symmetry of the machine housing.

2. Machine as claimed in claim 1, wherein said mounting parts are arranged in pairs and are provided at least at one of the lower and upper ends of the support plates.

3. Machine as claimed in claim 2, wherein the mounting parts are arranged symmetrically with respect to the vertical plane of symmetry and inclined by an angle ($\alpha$ or $\beta$) with respect to the latter, a maximum value of said angles being 60°.

4. Machine as claimed in one of claims 1 to 3, wherein the annular support plates are provided in the area of the vertical plane of symmetry with an extension to which a horizontally and axially extending mounting plate is welded, the mounting plate is welded to tube sections with vertical axis and the tube sections are directly or indirectly welded to the housing.

5. Machine as claimed in claim 4, wherein the mounting between the housing and the mounting plates is effected at the bottom of box-like indentations in the machine housing.

6. Machine as claimed in claim 5, wherein the mounting plates attached to the annular support plates have different diameters which, seen from one machine end, are stepped smaller towards the other end and the associated mounting points at the housing are correspondingly similarly stepped.

7. Machine as claimed in claim 6, wherein between the individual mounting parts radial transverse walls are provided which subdivide the annular space between the laminated stator core and housing into individual chambers.

8. Machine as claimed in claim 7, wherein the transverse walls are in each case constructed of two parts and consist of at least one first ring which is attached to the stator core and at least one second ring which is attached to the housing, in which arrangement the free ring ends overlap and a seal, which is elastic at least in the axial direction, is provided at the overlap, and, seen from the other machine end, the outside diameters of the first rings are in each case smaller than the inside diameter of the second ring adjacent to it.

* * * * *